United States Patent
Baker et al.

(10) Patent No.: US 9,558,365 B1
(45) Date of Patent: Jan. 31, 2017

(54) SYSTEMS AND METHODS FOR CREATING AND SHARING PROTECTED CONTENT

(71) Applicant: Kirigami, LLC, Apex, NC (US)

(72) Inventors: Douglas Dane Baker, Apex, NC (US); David L. Hamm, Cary, NC (US)

(73) Assignee: KIRIGAMI, LLC, Apex, NC (US)

( * ) Notice: Subject to any disclaimer, the term of this patent is extended or adjusted under 35 U.S.C. 154(b) by 0 days.

(21) Appl. No.: 14/979,245

(22) Filed: Dec. 22, 2015

(51) Int. Cl.
  *H04L 29/06* (2006.01)
  *G06F 21/62* (2013.01)
  *G06F 21/10* (2013.01)

(52) U.S. Cl.
  CPC ........... *G06F 21/6218* (2013.01); *G06F 21/10* (2013.01)

(58) Field of Classification Search
  CPC ........................................................ G06F 21/10
  See application file for complete search history.

(56) References Cited

U.S. PATENT DOCUMENTS

| | | | | |
|---|---|---|---|---|
| 7,403,743 B2 * | 7/2008 | Welch | ..................... | G06Q 20/32 340/10.1 |
| 8,359,332 B1 * | 1/2013 | Diamond | ................. | G06F 17/21 707/781 |
| 8,584,257 B2 * | 11/2013 | Kortum | ................ | H04N 7/1675 726/2 |
| 8,588,739 B2 * | 11/2013 | Kawabata | ........... | G06F 3/04883 455/410 |
| 9,027,153 B2 * | 5/2015 | Wang | ...................... | G06F 21/84 726/27 |
| 2014/0020018 A1 * | 1/2014 | Narasimha | ......... | H04N 21/8358 725/35 |
| 2015/0302600 A1 * | 10/2015 | Kreder, III | ............... | G06K 9/34 382/283 |
| 2015/0371013 A1 * | 12/2015 | Reckless | ................. | G06F 21/10 726/26 |

* cited by examiner

*Primary Examiner* — Shawnchoy Rahman
(74) *Attorney, Agent, or Firm* — Hunton & Williams LLP

(57) ABSTRACT

Systems and methods for creating and sharing protected content between individuals is disclosed. In one embodiment, a method for creating and sharing protected content between individuals may include (1) receiving foundation content; (2) receiving a selection of cover content; (3) receiving a selection of one or more unlock actions; (4) receiving a selection of one or more recipients for the protected content; (5) at least one computer processor creating a layered data file comprising the foundation content fully obscured by the cover content; (6) providing the one or more recipients access to the layered data file; (7) receiving an unlock action by the one or more recipients; (8) verifying, by the at least one computer processor, the unlock action; and (9) displaying to the one or more recipients the foundation content from the layered data file.

19 Claims, 2 Drawing Sheets

SYSTEMS AND METHODS FOR CREATING AND SHARING PROTECTED CONTENT

BACKGROUND OF THE INVENTION

1. Field of the Invention

The present invention generally relates to systems and methods for creating and sharing protected content between individuals.

2. Description of the Related Art

With mobile technology and social media now ubiquitous, the demand for sharing content between individuals has never been greater. Many times, there is a desire to protect content shared between individuals.

SUMMARY OF THE INVENTION

Embodiments disclosed herein relate to the creation, distribution, and third party access of protected content. For example, in one embodiment, a mobile application executed by an electronic device may take foundation content and may overlay cover content thereby fully hiding or obscuring the foundation content. The foundation content may then be accessed by a third party performing a designated unlock action.

In one embodiment, after the foundation and cover content have been selected, the mobile application may create the layered data file with the foundation content fully obscured by the cover content. The mobile application may then grant a third party recipient access to the layered data file. The mobile application may then accept and verify third party unlock actions. Once an unlock action has been verified, the mobile application may then grant a third party recipient access to the foundation content.

Systems and methods for creating and sharing protected content between individuals is disclosed. In one embodiment, a method for creating and sharing protected content between individuals may include receiving foundation content; receiving a selection of cover content; receiving a selection of one or more unlock actions; receiving a selection of one or more recipients for the protected content; at least one computer processor may create a layered data file that may comprise the foundation content fully obscured by the cover content; providing the one or more recipients access to the layered data file; receiving one or more unlock action by the one or more recipients; verifying, by the at least one computer processor, the unlock action; and displaying to the one or more recipients the foundation content from the layered data file.

In one embodiment, the foundation content may be one or more of an image, a video, a word processing file, a spreadsheet, or other type of data file.

In one embodiment, the cover content may be one or more of an image, a video, a word processing file, a spreadsheet, or other type of data file.

In one embodiment, the method may further include receiving a selection of a transition style between the cover content and foundation content.

In one embodiment, the unlock action may include the receipt of finger gestures on an electronic device screen.

In one embodiment, the unlock action may include entering a code.

In one embodiment, the unlock action may include receiving an action suggested by the cover content.

In one embodiment, the method may further include a selection of a transition style from the cover content to the foundation content.

In one embodiment, the transition style may be an animation.

In one embodiment, the method may further include receiving a selection of one or more restrictions on viewing the foundation content.

In one embodiment, the restrictions may include a limit on the number of time the foundation content may be viewed by any of the one or more recipients.

In one embodiment, the restrictions may include a limit on the amount of time the layered data file is available for access by any of the one or more recipients.

In one embodiment, the restrictions may include a limit on the total amount of time the foundation content may be viewed by any of the one or more recipients.

In one embodiment, the restrictions may include a limit on the number of incorrect unlock actions performed by a recipient.

In one embodiment, the restrictions may bear an inverse relationship with the number of incorrect unlock actions performed by a recipient.

In one embodiment, the performed unlock action may be verified by comparing the performed unlock actions against the one or more selected unlock actions.

In one embodiment, the method may further include receiving a recipient's personal unlock action.

In one embodiment, verifying the performed unlock action may consist of verifying correct entry of the personal unlock action, In one embodiment, receiving one or more performed unlock action by the recipient may include both the selected unlock actions and the personal unlock action.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
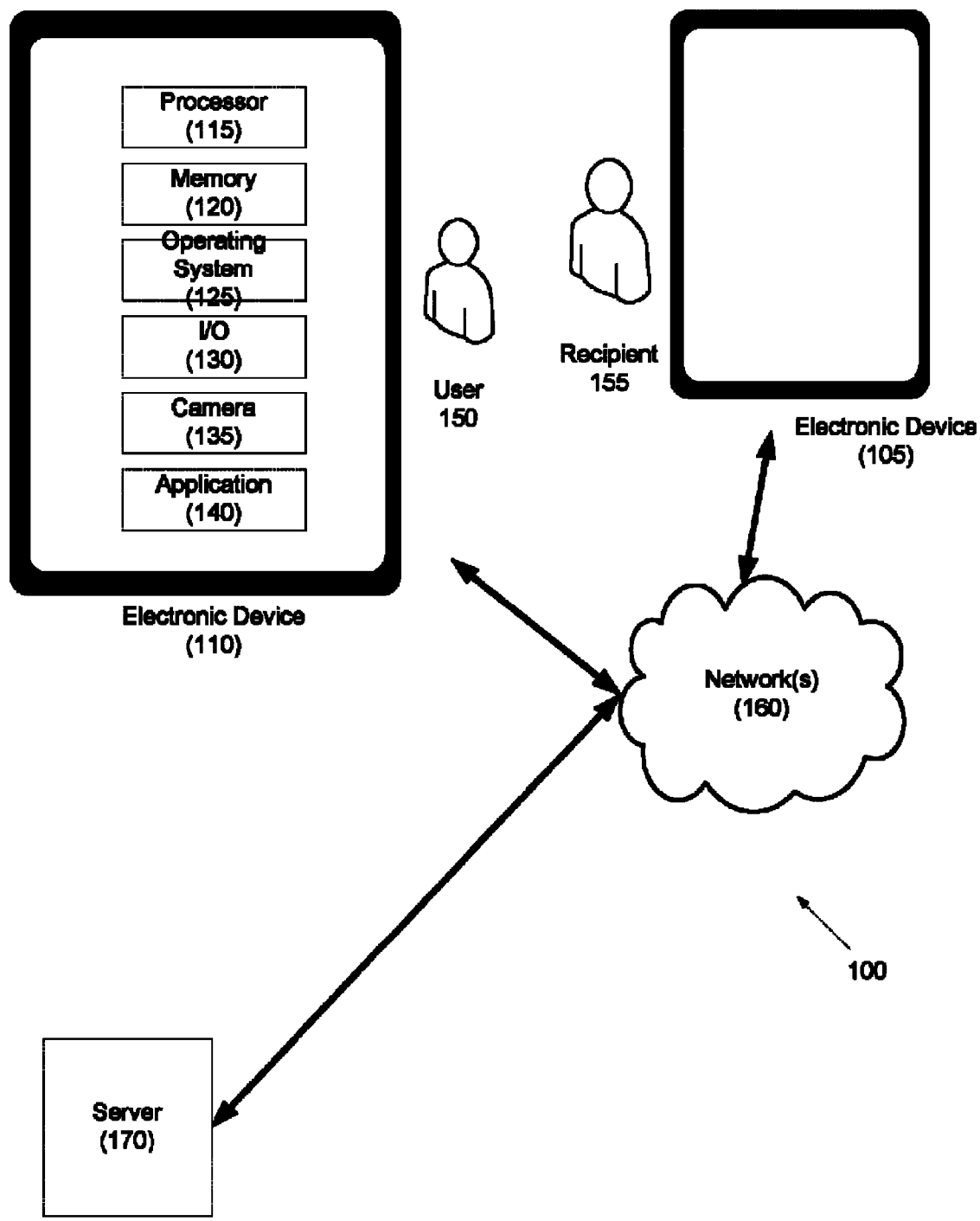
FIG. 1 depicts a system for creating, distributing, and granting access to protected content according to one embodiment.
Figure 2:
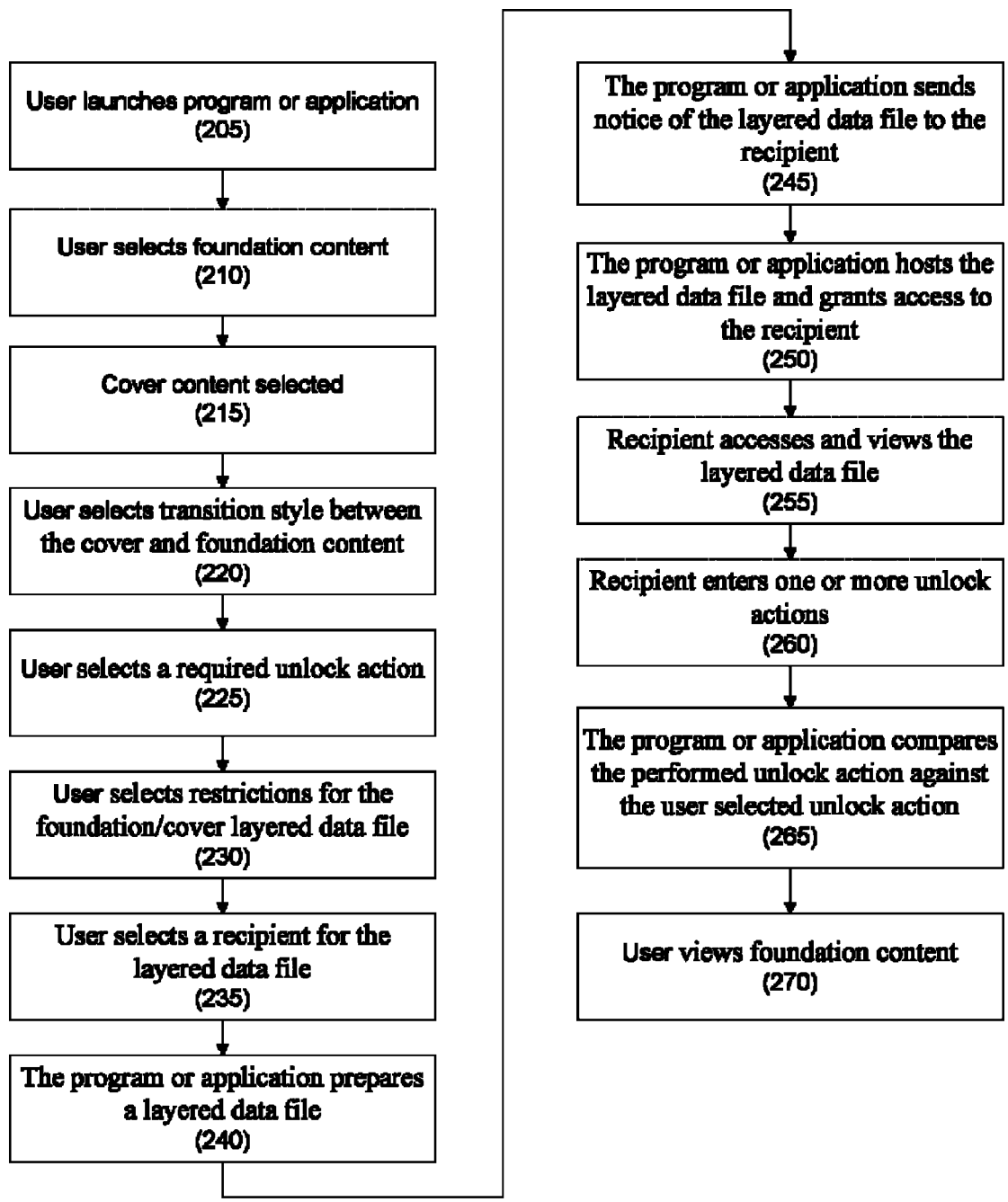
FIG. 2 depicts a method for creating, distributing, and granting access to protected content according to one embodiment.

Several embodiments of the present invention and their advantages may be understood by referring to FIGS. 1-2.

Referring to FIG. 1, a block diagram of a system for creating, distributing, and granting access to protected content is disclosed. System 100 may include electronic devices 105 and 110, network(s) 160, and back end 170. Electronic devices may include any suitable device, including smartphones, tablet computers, notebook computers, netbook computers, e-reading devices, etc. Examples include Apple's iPhone and iPad, Samsung's Galaxy, etc.

In one embodiment, electronic device 110 may include processor 115, memory 120, and an operating system 125 executed by processor 115. Electronic device may further include input/output ("I/O") 135 which may include wireless communication capability, touch/keypad inputs, voice input, etc. In one embodiment, an input device, such as camera 135, may be provided.

One or more computer program or application 140 may be stored in memory 120 and may be executed by processor 115. In one embodiment, application 140 may include an application capable of creating layered data files from content provided by a user of electronic device 110. In one embodiment, application 140 may also be capable of hosting those layered data files for access by third party recipients.

Electronic device 110 may communicate with external sites (e.g., websites), other devices, etc. using network(s) 160. Network(s) 160 may be any suitable communication network or combination of communication networks, including wired, WiFi, cellular, Bluetooth, NFC, etc.

In one embodiment, server 170 may be provided. In one embodiment, the server 170 may store, further process, etc. layered data files.

Referring to FIG. 2, a method for creating, distributing, and granting access to protected content is described.

In step 205, a user may launch and execute a program or application on a device, such as a cover/foundation application.

In step 210, the user may select foundation content. The foundation content may be an image, video, word processing file, audio file, spreadsheet, or any other type of data file that a user may want to hide, obscure, or otherwise protect. In one embodiment, the foundation content may comprise more than one data file, and the more than one data file may comprise more than one data file type. In another embodiment where the foundation content may be an image or video, the image or video may be taken using the electronic device's camera.

In step 215, cover content used to obscure the foundation content may be selected. The cover content may be a video, word processing file, spreadsheet, audio file, or any other type of data. In one embodiment, the cover data type may be the same as the foundation data type (e.g., both the cover data and the foundation data are images). In another embodiment, the cover data type and the foundation data type may be different (e.g., the cover data type is an image, while the foundation data type is a spreadsheet).

In one embodiment, the user may select the cover content. In another embodiment, the application may select the cover content. The cover content selected by the application may be randomly chosen, or may be chosen and correlated to the selected unlock action (e.g., if the unlock action consists of performing a finger drawing gesture on the touch screen, such as drawing a circle, the cover content may be an image of a circle). In still another embodiment, the application may select the cover content that it determines to best hide, obscure, or protect the foundation content. In another embodiment, the foundation content and cover content may comprise a single layer. The foundation content may be hidden within the cover content.

In one embodiment, the cover content may come from third parties such as advertisers, news providers, television networks, etc. This cover content may include embedded content. For example, an advertisement for flights to Paris could be embedded in a cover photo or video of the Eiffel Tower. The third party content may be related or unrelated to the foundation content.

In one embodiment, the cover content may be selected by the user and relevant advertising or third party content, such as news or entertainment photos or video, may be matched by the application and embedded. For example, a sports news provider could provide embedded basketball score of a specific game hidden in cover content consisting of photo or video highlights of the same game.

In one embodiment, the application may accept inputs including but not limited to image recognition or user-supplied hashtags to match to relevant third party content. The third party content may be cover content or embedded content within the cover content.

In one embodiment, a user may select from third party content to serve as the cover content. For example, a user could send a highlights video of a specific baseball game to a recipient.

In one embodiment, a user may pay to deactivate advertisements or pay to activate the ability to send third party content (such as game highlights and scores). In one embodiment the user may pay via in-app purchases or other online payment system. In step 220, a user may select a transition style between the cover and foundation content. Examples of transition styles may include instantaneous deletion of the cover image or a cinematic transition such as a page turn animation, a pixelated dissolve of the cover content, a curtain raising, or the like. In one embodiment, a user may select a default transition style be used. In another embodiment, a user may select a random setting whereby the mobile application randomly selects from a set of transition styles. In another embodiment, the application may allow for a user to create his or her own custom transition. The transition styles may incorporate music or sound effects in connection with the reveal of the foundation content.

In step 225, a user may select a required unlock action. The unlock action may consist of a performing one or more drawing gesture on the touch screen, such as drawing a shape, letter, or number. The unlock action may consist of performing one or more finger gesture on a specific area of the screen. The unlock action may consist of performing one or more touch screen input gesture, such as a tap, double tap, swipe, two-finger tap or swipe, pinch open/close, three-finger tap/double tap/swipe, four finger tap/double tap/swipe/pinch open or close. The unlock action may consist of entering in one or more emoji characters as a passcode. For example, selecting some specific number of emojis from a list in the correct sequence, such as 3 "eggplant" emojis, or 1 smiley face, 1 French horn, and 1 party hat. The unlock action may consist of entering a multi-digit passcode. The unlock action may consist of typing in one or more missing word(s) or phrase(s) from a music lyric, film quote, famous quote, "inside joke" among friends, or the like. The unlock action may consist of typing an answer to a question or clue selected by the content sender. The question or clue and answer may be in the form of text, emojis, images, video, audio, or any combination.

In another embodiment, the unlock action may consist of typing an answer, in the form of text, emojis, images, video, audio, or any combination thereof, based on a prompt in a video, photo, audio, music, or film clip that is part of the cover content. The unlock action may consist of performing an action based on a clue found in the cover content. The unlock action may consist of utilizing one or more device-specific technologies such as biometric identifiers, including fingerprint, eye print, or voice print. The unlock action may consist of a secondary software application that may provide an unlock key, where the unlock key may be any of the above mentioned unlock actions.

In one embodiment, a user may select one or more unlock actions. When a user selects more than one unlock action, the unlock actions may consist of any combination of the above unlock actions. When a user selects more than one unlock action, the user may require some number of the selected unlock actions be successfully performed by a recipient. For example, if a user selects three unlock actions, the user may require a recipient to perform 1, 2, or 3 of the selected unlock actions. In one embodiment, a user may select more than one unlock action, but choose only one correct unlock action from the selected unlock actions.

Any suitable unlock action, or combination of unlock actions, may be used as is necessary and/or desired.

In one embodiment, a user may select a content sensitivity level ranging from low to high sensitivity. The chosen content sensitivity level may dictate which unlock actions may be available for use with the foundation content. Less secure unlock actions may not be available when higher sensitivity levels are selected. As sensitivity levels increase, the number of required unlock actions may increase as well.

In one embodiment, a user may allow the application to select one or more unlock actions. The application may also be able to select unlock actions for a given content sensitivity level.

In one embodiment, an unlock action may reveal a clue for entry of a subsequent unlock action. The revealed clue may be embedded in the cover content.

In step 230, a user may select restrictions for the foundation/cover layered data file. Restrictions may include limitations on the number of incorrect attempted unlock actions. For example, after a user defined number of incorrect unlock actions, the recipient may lose access to the layered data file. Notification may be sent through the mobile application to the user that access has been revoked.

Restrictions may also include durational limitations on how long a recipient is granted access to a layered data file. A user may select a deadline for the recipient to access the layered data file, and unlock and view the foundation content. For example, a user may restrict recipient access to one week after granting access, a specified date, after the occurrence of a specific event, etc.

Restrictions may also include durational limitations on how long the foundation content may be viewed. For example, a user may restrict foundation content to 30 seconds of viewing, 1 hour of viewing, etc. This durational limitation may be on a per view basis, or on a total time viewed basis.

Restrictions may also include limitations on the number of times foundational content may be viewed. For example, a user may restrict a layered data file such that the foundation content be viewed no more than 1 time, 2 times, 3 times, etc.

Restrictions may also include directly relating the unlock action to the number of times foundational content may be viewed. For example, the number of emoji characters required to be entered to unlock an emoji passcode may represent the maximum number of times foundational content may be viewed (e.g., if an unlock code consisting of 3 emoji is required, then only 3 views of the foundation content may be permitted, or 3 seconds, minutes, hours, days, etc., of access to the layered data file may be permitted).

In one embodiment, a time based restriction may bear an inverse relationship with the number of incorrect attempted unlock actions such that as the number of incorrect attempted unlock actions increases, the time available to access the foundation content decreases.

In one embodiment, a numerical view based restriction may bear an inverse relationship with the number of incorrect attempted unlock actions such that as the number of incorrect attempted unlock actions increases, the time available to access the foundation content decreases.

Restrictions may also include a user selection as to whether the foundation content may be downloaded by a recipient upon entry of a correct unlock action.

In one embodiment, a user may select any or all of the above restrictions to be implemented after a defined number of incorrect unlock actions.

In step 235, a user may select a recipient for a layered data file. A user may select a recipient from a list of registered mobile application users. A user may select a recipient from an address book maintained within the electronic device application. A user may select a recipient from a friends list maintained within the electronic device application. A user may select a recipient by entering identifying data for the recipient, such as name, email address, mobile phone number, or social media account identifier.

In one embodiment, more than one method of identifying a recipient may be used.

In one embodiment, more than one recipient may be selected.

In step 240, the application may prepare a layered data file. The layered data file may consist of the foundation content, cover content, transition style data, unlock action data, restriction data, and recipient information. The application may host the layered data file.

In step 245, the application may send notice of the layered data file to the intended recipient. The type of notice sent by the application to a recipient may correlate to the type information provided by the user. For example, if a user selected a recipient name from a registered mobile application user list, the notice may consist of a push notification to the recipient's device, or a message within the mobile application that may be viewed when the recipient opens his or her application. Indication of a pending message may appear in conjunction with the application icon on the recipient's device. If a user provides a mobile phone number, notice may consist of a text (SMS) message sent to that number. A text message may consist of pertinent information including a link to the layered data file within the application, a link to download the mobile application, or a link to access the layered data file on a web-based version of the application. If the user provided a social media account, notice may consist of a message sent to the social media account. Such a message may consist of pertinent information including a link to the layered data file within the mobile application, a link to download the application, or a link to access the layered data file on a web-based version of the application.

In another embodiment, the layered data file may reside in the cloud and may not be sent to the recipient.

In step 250, the layered data file may be hosted by the application, and access to the layered data file may be granted to the recipient. A recipient may only be able to access the layered data file by installing the application on his or her device, or by registering for an account and accessing a web-based version of the mobile application. The layered data file may not be physically sent to the recipient.

In step 255, the recipient may access and view the layered data file. Upon accessing the layered data file, a recipient may view the cover content. A recipient may also view any restrictions placed on the layered data file by the user. A recipient may also view any unlock action clues provided in conjunction with the layered data file. For example, the cover content may be an image of something round, such as a wheel or a wreath. This image may provide a clue that the unlock action requires a recipient to draw a circle on the device screen, or trace the circle on the device screen. Also for example, the mobile application may overlay a clue onto the cover content, such as a picture of a circle or emoji. If the cover content is a video or contains a sound file, a recipient may watch or listen to the cover content for any unlock action clue.

In one embodiment, the mobile application may convey information, to a recipient, within the cover content. For example, if a user has selected multiple unlock actions, the cover content may include an image of a lock for each unlock action required. Thus if three unlock actions were required, the cover content may include three images of locks.

In step 260, the recipient may enter one or more unlock action. In one embodiment, a registered recipient may set their own personal unlock action that may be tied to their mobile application account, for additional security. The recipient's personal unlock action may override any unlock actions set by sender.

In one embodiment, a recipient with a personal unlock action must perform both the personal unlock action and the user defined unlock action. In one embodiment, the user may set which unlock action must be performed first. In another embodiment, the recipient may set which unlock action must be performed first. In yet another embodiment, the mobile application is set to accept the unlock actions in any order.

In one embodiment, a recipient may add or change his or her personal unlock action. This addition or change to the personal unlock action may apply to all previously received cover/foundation sets.

In one embodiment, the application may prompt a recipient for an unlock action. In another embodiment, a recipient may affirmatively indicate that an unlock action is to be entered. For example, a recipient may click a button within the application that states, "perform unlock action." In yet another embodiment, any interaction with the layered data file by a recipient are treated as unlock actions by the application.

In one embodiment, the mobile application may allow for a recipient to query a sender for clues to unlock the foundation content. For example, such a query could take the form of text messages (SMS), text or video chat, text or video messages, photos/videos from recipient to sender, etc.

In step 265, the one or more unlock action 260 may be compared against the user selected unlock action 225. If recipient entered unlock action 260 matches the user selected unlock action 225, the application may trigger the transition between the cover content and foundation content 220. If recipient entered unlock action 260 does not match the user selected unlock action 225, the mobile application may alert the recipient that an incorrect unlock action was entered.

In one embodiment, a recipient may temporarily lose access to a layered data file if a threshold number of incorrect unlock actions are exceeded within a specified time frame. For example, if a recipient performs four incorrect unlock actions within 1 minute, the application may revoke recipient access to the layered data file for five minutes.

In one embodiment, upon performance of an incorrect unlock action, the mobile application may track the impact on any user selected restriction and update the recipient accordingly. For example, if a user has restricted the layered data file so that 5 total views of the foundation content are possible, with that number decreasing by 1 for each incorrect unlock action performed by a recipient, then upon performance of an incorrect unlock action, the mobile application may alert the recipient that the total number of foundation content views has been reduced from 8 to 7.

If a recipient has exceeded the number of unlock action attempts provided by a user, the mobile application may permanently revoke the recipient's access to the layered data file. In one embodiment, if a recipient's access has been revoked, notice may be sent to the user. In another embodiment, if a recipient's access has been revoked, the recipient may view an animation indicating that access has been revoked. For example, a recipient may see the cover content dissolving, melting, swirling as if going down a drain, or any other animation that would indicate loss of access to the layered data file.

In one embodiment, the application may provide graphical feedback based on performance of unlock actions. For example, if the cover content includes an image of a lock, performance of a correct unlock action may result in the image changing to a lock in the unlocked position. Conversely, if an incorrect unlock action is performed, the lock image may change from a baseline color to red, or may shake and remain locked.

In another embodiment, tactile feedback may be incorporated within unlock action attempts. For example, performance of an incorrect unlock action may result in the device vibrating in a specified manner, while performance of a correct unlock action may result in the electronic device vibrating in a different and distinct manner.

In another embodiment, the recipient's device may alert the recipient who has performed a correct unlock action. For example, if the cover content includes an image of a lock, performance of a correct unlock action may result in the image changing to a lock in the unlocked position.

In step 270, upon performance of a correct unlock action, a recipient may view the foundation content. If the user has set the restrictions to allow, a recipient may now download the foundation content onto his or her electronic device.

The mobile application may track the number of views or duration of viewing to compare against any user set restrictions.

In one embodiment, the electronic device may periodically notify a recipient of the remaining views or time to view the foundation content.

In one embodiment, the foundation content may be graphically manipulated in a manner that signals to a recipient that access to the foundation content is decreasing relative to any user selected restrictions. For example, if a layered data file is restricted such that the foundation content may be viewed a maximum of 7 times, after the third viewing, the foundation content may appear to visually dissolve in the lower right corner with a solid black color representing the "dissolved" portion of the image. After the fifth viewing, more than half the foundation content may be dissolved and no longer viewable, and so on. Also for example, visual degradation may involve decreased opacity, or the appearance of "glitch" or scan-line effects mimicking aged video, or increased blur or color or other image or video effects, or a change in color or color desaturation (from color to black/white), or a change in brightness or contrast, or appearance of texture patterns that mimic toxic waste or organic decomposition. Visual degradation of the foundation content may occur abruptly, gradually, in halting steps (like a stop motion animation), or smoothly.

Any suitable way of visually degrading content may be used as is necessary and/or desired.

In one embodiment, the device may remember or store a recipient's performance of the correct unlock action and may subsequently allow the recipient direct access to the foundation content without re-entry of the unlock action.

In one embodiment, the device may require re-entry of the unlock action upon subsequent attempts by a recipient, to view the foundation content.

In another embodiment, the electronic device may continue to hide the foundation content after a successful unlock action. The recipient may then perform an action to reveal it each time the recipient wishes to view the foundation content. The post-successful-unlock action may be the original unlock action (e.g., the user must continue performing the unlock action each time they wish to view) or a different action such as a touch gesture (e.g., a simple horizontal swipe or tap). The different action may be simpler or more complex than the original unlock action.

It should be recognized that although several embodiments have been disclosed, these embodiments are not exclusive and aspects of one embodiment may be applicable to other embodiments.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ 10 operating system, the Microsoft Windows™ 8 operating system, Microsoft Windows™ 7 operating system, the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for creating and sharing protected content between individuals, comprising:
   receiving foundation content at a first user electronic device;
   receiving a selection of cover content at the first user electronic device;
   receiving a selection of one or more unlock actions at the first user electronic device;
   receiving a selection of a recipient for the protected content at the first user electronic device;
   at least one computer processor creating a layered data file comprising the foundation content fully obscured by the cover content;
   providing a recipient electronic device associated with the recipient the layered data file;
   receiving an unlock action at the recipient electronic device;
   verifying, by the at least one computer processor, the unlock action;
   displaying the foundation content from the layered data file.

2. The method of claim 1, wherein the foundation content is one or more of an image, a video, a word processing file, and a spreadsheet.

3. The method of claim 1, wherein the cover content is one or more of an image, a video, a word processing file, and a spreadsheet.

4. The method of claim 1, wherein the unlock comprises one or more finger gestures on an electronic device screen.

5. The method of claim 1, wherein the unlock action comprises the receipt of a code.

6. The method of claim 1, wherein the more unlock action comprises the receipt of an action suggested by the cover content.

7. The method of claim 1, further comprising:
receiving a selection of a transition style from the cover content to the foundation content.

8. The method of claim 7, wherein the transition style comprises an animation.

9. The method of claim 1, further comprising:
receiving a selection of a restriction for viewing the foundation content.

10. The method of claim 9, wherein the restriction comprises a limit on the number of time the foundation content may be viewed by any of the one or more recipients.

11. The method of claim 9, wherein the restriction comprises a limit on the amount of time the layered data file is available for access by any of the one or more recipients.

12. The method of claim 9, wherein the restriction comprises a limit on the total amount of time the foundation content may be viewed by any of the one or more recipients.

13. The method of claim 9, wherein the restriction comprises a limit on the number of incorrect unlock actions performed by a recipient.

14. The method of claim 1, wherein the unlock action is verified by comparing the performed unlock actions against the one or more selected unlock actions.

15. A method for creating and sharing protected content between individuals, comprising:
receiving a selection of cover content at a first user electronic device;
receiving a selection of content to be hidden in the cover content at the first user electronic device;
receiving a selection of one or more unlock actions at the first user electronic device;
receiving a selection of a recipient for the hidden content at the first user electronic device;
at least one first user electronic device computer processor creating a layered data file comprising the hidden content fully obscured within the cover content;
providing a recipient electronic device associated with the recipient access to the layered data file;
receiving an unlock action at the recipient electronic device;
verifying, by a computer processor, the unlock action;
displaying the hidden content from the layered data file.

16. The method of claim 15, wherein the cover content is one or more of an image, a video, a word processing file, and a spreadsheet.

17. The method of claim 1, wherein the first user electronic device comprises the at least one computer processor that creates the layered data file.

18. The method of claim 1, wherein the at least one computer processor that verifies the unlock action is a remote server.

19. The method of claim 1, wherein the recipient electronic device comprises the at least one computer processor that verifies the unlock action.

* * * * *